US00RE39185E

(19) United States
(12) Reissued Patent
Noe et al.

(10) Patent Number: US RE39,185 E
(45) Date of Reissued Patent: Jul. 18, 2006

(54) ALL-SIDED MOUTHBRUSH

(76) Inventors: Dennis W. Noe, T&T Products, LLC 1750 Kalakaua Ave., Suite 1907, Honolulu, HI (US) 96826; Chris M. Sold, T&T Products, LLC 1750 Kalakaua Ave., Suite 1907, Honolulu, HI (US) 96826

(21) Appl. No.: 10/246,253

(22) Filed: Sep. 18, 2002

Related U.S. Patent Documents

Reissue of:
(64) Patent No.: 6,119,296
Issued: Sep. 19, 2000
Appl. No.: 09/211,124
Filed: Dec. 14, 1998

(51) Int. Cl.
*A46B 9/04* (2006.01)

(52) U.S. Cl. ..... 15/104.94; 15/111; 15/167.1; 15/176.6

(58) Field of Classification Search ..... 15/104.94, 15/106, 110, 111, 167.1, 176.1, 176.6; D4/104, D4/106, 108
See application file for complete search history.

(56) References Cited

U.S. PATENT DOCUMENTS

| | | | | | |
|---|---|---|---|---|---|
| 1,125,532 | A | * | 1/1915 | Himmel | 15/117 |
| 1,993,662 | A | | 3/1935 | Green | |
| 2,244,615 | A | | 6/1941 | Garcin | |
| 2,622,259 | A | * | 12/1952 | Chauvin | 15/167.1 |
| 2,719,315 | A | | 10/1955 | Sheehan | |
| 3,337,893 | A | * | 8/1967 | Fine et al. | 15/111 |
| 4,010,509 | A | * | 3/1977 | Huish | 15/167.1 |
| 4,167,794 | A | * | 9/1979 | Pomeroy | 15/188 |
| 4,328,604 | A | * | 5/1982 | Adams | 15/110 |
| 4,585,119 | A | | 4/1986 | Boyington | |
| D287,072 | S | | 12/1986 | Pfleger | |
| 5,005,246 | A | * | 4/1991 | Yen-Hui | 15/111 |
| 5,027,463 | A | | 7/1991 | Daub | |
| 5,148,567 | A | | 9/1992 | Daub | |
| 5,224,234 | A | * | 7/1993 | Arsenault et al. | 15/167.1 |
| 5,360,025 | A | | 11/1994 | Klinkhammer | |

(Continued)

FOREIGN PATENT DOCUMENTS

| | | | | |
|---|---|---|---|---|
| GB | 2 040 161 | | 8/1980 | |
| GB | 2 391 462 | | 2/2004 | |
| SU | 1708283 | * | 1/1992 | 15/167.1 |
| WO | WO 98/18364 | | 5/1998 | |
| WO | WO 98/22000 | | 5/1998 | |

*Primary Examiner*—Terrence R. Till
(74) *Attorney, Agent, or Firm*—Finnegan Henderson Farabow Garrett & Dunner, LLP

(57) ABSTRACT

[An all-sided mouthbrush] *A device* for cleaning [a] *the* mouth of a user. The [all-sided mouthbrush] *device* includes a handle including a first end having first and second sides, bristles extending from the first side, and an alternate cleaning device [connected to] *on* the second side, wherein the bristles clean teeth of the user and the alternate cleaning device cleans [a] *the* tongue and inner side of the mouth of the user. The alternate cleaning device may be [in the form of one of] a plurality of parallel ridges, a plurality of columns of tuft-shaped bristles, a plurality of spade headed bristles, a scouring pad-like surface or a plurality or off set rows of bristle-like structures [made of soluble crystals] for scraping the tongue and inner side of the mouth of the user. [A plurality of] *The device may include* templates each including a respective alternate cleaning [surface and a connecting] device [for connecting one of the plurality of templates] *and a connection* to the second side [covering said alternate cleaning] *of the* device [may be attached to the all-sided mouthbrush]. [A resealable packet is provided for each of the templates and for receiving the first end of the handle when not in use for protecting the templates and handle from dirt and germs. A mouth freshening liquid is provided within the pouches for further protecting the templates and handle and provide additional freshening for the mouth of the user].

21 Claims, 12 Drawing Sheets

U.S. PATENT DOCUMENTS 5,396,679 A 3/1995 Brown et al.
D363,820 S 11/1995 Winge
5,544,383 A * 8/1996 Gamble ..... 200/16 E
D377,867 S 2/1997 Berghash et al.
D399,349 S 10/1998 Barth
5,920,941 A 7/1999 Iannotta

* cited by examiner

ALL-SIDED MOUTHBRUSH

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates generally to toothbrushes and, more specifically, to a mouthbrush including conventional bristles on one side and an alternate cleaning device positioned on an opposing side of the mouthbrush, and an alternate embodiment is provided wherein a plurality of interchangeable bristle type or rigid structures are adapted to be connected over the alternate cleaning device.

2. Description of the Prior Art

Numerous types of toothbrushes have been provided in the prior art. For example, U.S. Pat. Nos. 2,622,259; 4,010,509; 4,328,604 and 5,544,383 all are illustrative of such prior art. While these units may be suitable for the particular purpose to which they address, they would not be as suitable for the purposes of the present invention as heretofore described.

U.S. Pat. No. 2,622,259

Inventor: Francis E. Chauvin

Issued: Dec. 23, 1952

This patent discloses a toothbrush including tapered rows of bristles whereby all surfaces of the teeth, namely the grinding surfaces, the sides, areas between the sides and particularly the surfaces between the teeth may be properly and substantially simultaneously cleaned by sweeping movements of the brush. The sides of the teeth are cleaned with a sweeping motion from the gums towards the grinding or biting surfaces while the grinding surfaces are cleaned with transverse sweeping movements of the brush.

U.S. Pat. No. 4,010,509

Inventor: Frederic G. Hulsh

Issued: Mar. 8, 1977

The invention is a double sulcus toothbrush having two groups of sulcus bristles which diverge at an angle relative to one another laterally of the toothbrush so that these groups may bear against the upper and lower teeth, inside and out, with the bristles entering the sulci at an angle appropriate for their cleansing, these bristles being optionally forwardly inclined, cut at a taper to facilitate brushing; of the rear sulci or separated by a group of conventional bristles which are shorter than the sulcus bristles for brushing the crowns of the teeth.

U.S. Pat. No. 4,328,604

Inventor: Gregory Adams

Issued: May 11, 1982

A brush adopted for cleaning of the teeth mouth and gums of the riser, comprising a toothbrush handle, ordinary toothbrush bristles affixed to one surface of a brush head at one end of the handle in the usual and customary manner and short softer bristles for cleaning of the interior of the mouth and for massaging of the gums affixed to all surfaces of the above-mentioned brush head at the brush end of the toothbrush handle.

U.S. Pat. No. 5,544,383

Inventor: John A. Gamble

Issued: Aug. 13, 1996

A toothbrush which provides the user with simultaneous brushing action within the user's mouth. The long handle has an end portion of a substantially elliptical cross-section in which a first side and a second side are of substantially similar elliptical curvature. Bristles are attached to both the first side and the second side in a similar pattern. The bristles on each side taper from a short extant near the end of the handle to a longer extant at a position farther from the end of the handle. Also, the bristles are formed in tufts substantially in rows latitudinally of the two sides.

SUMMARY OF THE PRESENT INVENTION

The present invention relates generally to toothbrushes and, more specifically, to a mouthbrush including conventional bristles on one side and an alternate cleaning device positioned on an opposing side of the mouthbrush, and an alternate embodiment is provided wherein a plurality of interchangeable bristle type or rigid structures are adapted to be connected over the alternate cleaning device.

A primary object of the present invention is to provide an all-sided mouthbrush that will overcome the shortcomings of prior an devices.

Another object of the present invention is to provide an all-sided mouthbrush which is able to clean the tongue and inner mouth surfaces in addition to cleaning the teeth of the user.

A further object of the present invention is to provide an all-sided mouthbrush including a handle having conventional toothbrush bristles extending from a side of one end thereof and a connection device for selectively receiving one of a plurality of templates on a side opposite the conventional toothbrush bristles.

A yet further object of the present invention is to provide an all-sided mouthbrush wherein the plurality of templates include a template having a ridged surface for scraping the tongue and inner surfaces of the mouth and a template having bristles forming tufts for scraping the tongue and inner surfaces of the mouth.

A still further object of the present invention is to provide an all-sided mouthbrush wherein the plurality of templates further include a template having spade shaped bristles for scraping the tongue and inner surfaces of the mouth and a template having a scouring-like pad for scrubbing the tongue and inner surfaces of the mouth.

A further object of the present invention is to provide an all-sided mouthbrush wherein the bristles include an upper surface formed of a soluble crystal substance able to freshen the mouth of tie user while brushing the teeth.

Another object of the present invention is to provide an all-sided mouthbrush able to be used as a platform for attaching various pads thereto.

A still further object of the present invention is to provide an all-sided mouthbrush including a plurality of non-abrasive pads for use in scraping, cleaning and massaging the tongue, gums and interior surfaces of the mouth of the user.

An even further object of the present invention is to provide an all-sided mouthbrush wherein the various absorbent pads scrape, clean and massage the tongue, gums and interior surfaces of the mouth with ointments, mouthwash and antiseptics such as hydrogen peroxide.

Another object of the present invention is to provide an all-sided mouthbrush that is simple and easy to use.

A still further object of the present invention is to provide an all-sided mouthbrush that is economical in cost to manufacture.

Additional objects of the present invention will appear as the description proceeds.

An all-sided mouthbrush for cleaning a mouth of a user is disclosed [by the present invention]. The all-sided mouthbrush includes a handle including a first end having first and second sides, bristles extending from the first side, and an alternate cleaning device connected to the second side, wherein the bristles clean teeth of the user and the alternate cleaning device cleans a tongue and inner side of the mouth of the user. The alternate cleaning device may be in the form of one of a plurality of parallel ridges, a plurality of columns of tuft-shaped bristles, a plurality of spade headed bristles, a scouring pad-like surface or a plurality of off set rows of bristle-like structures made of soluble crystals for scraping the tongue and inner side of the mouth of the user. A plurality of templates each including a respective alternate cleaning surface and a connecting device for connecting one of the plurality of templates to the second side covering said alternate cleaning device may be attached to the all-sided mouthbrush. A resealable packet is provided for each of the templates and for receiving the first end of the handle when not in use for protecting the templates and handle from dirt and germs. A mouth freshening liquid is provided within the pouches for further protecting the templates and handle and provide additional freshening for the mouth of the user.

To the accomplishment of the above and related objects, this invention may be embodied in the form illustrated in the accompanying drawings, attention being called to the fact, however, that the drawings are illustrative only, and that changes maybe made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

Figure 10:
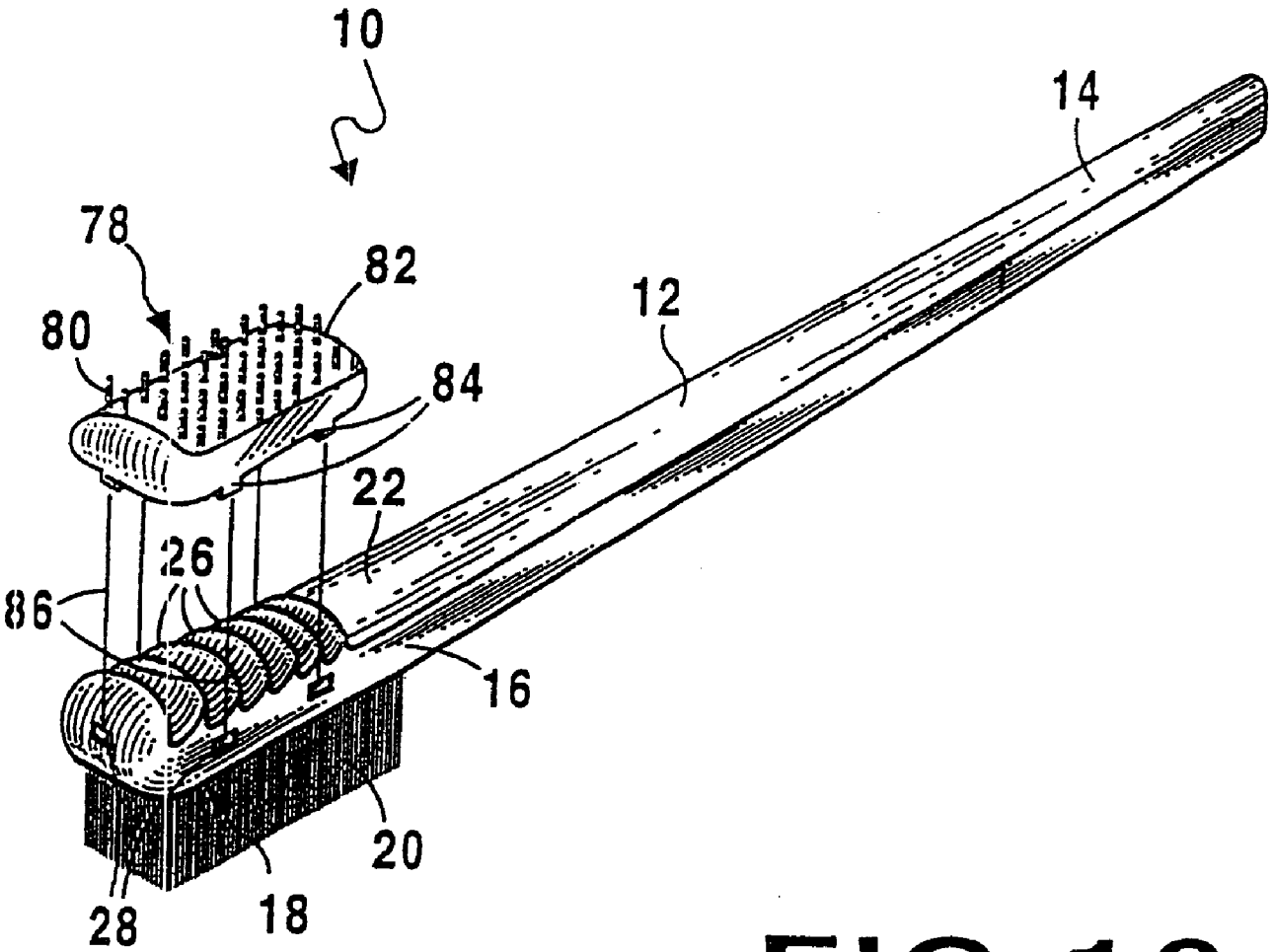
Figure 11:
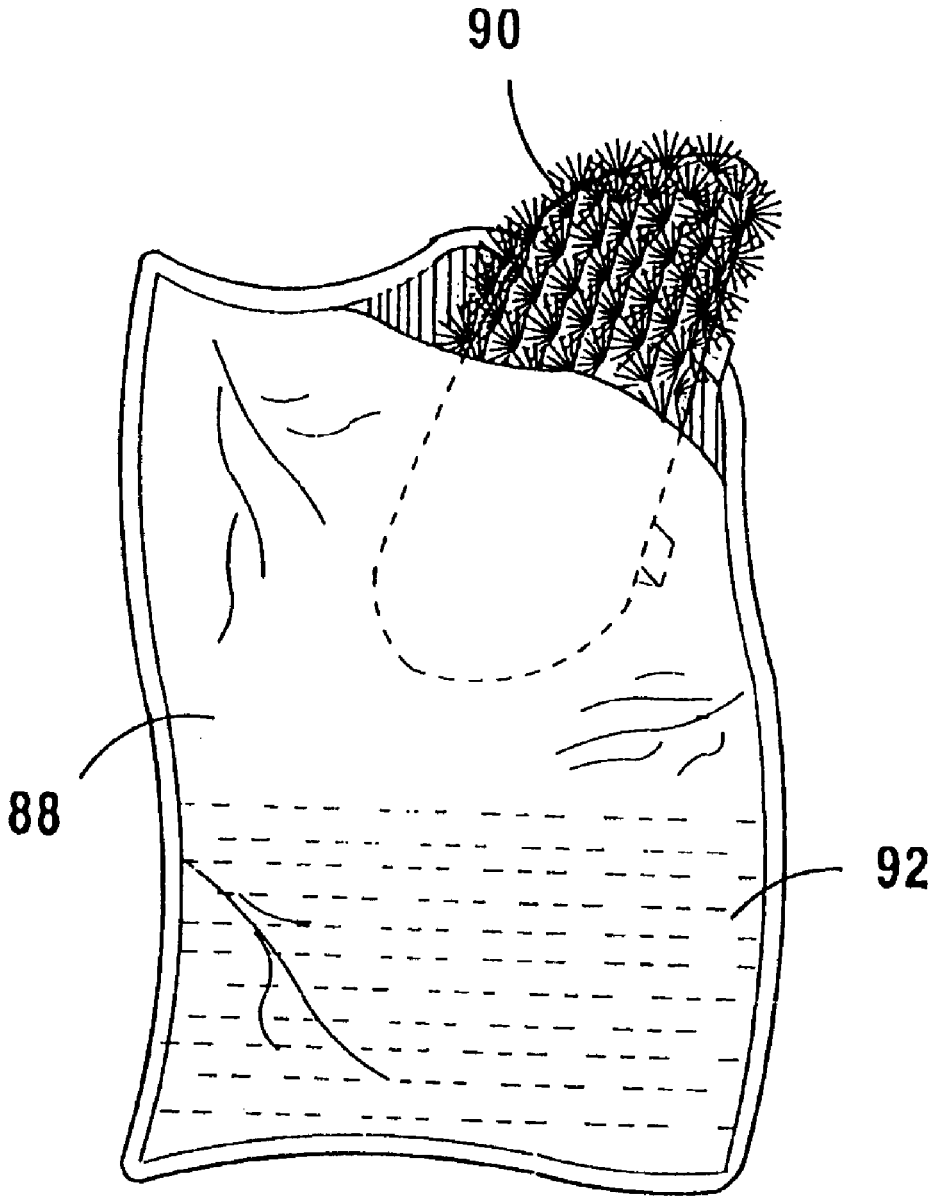
Figure 12:
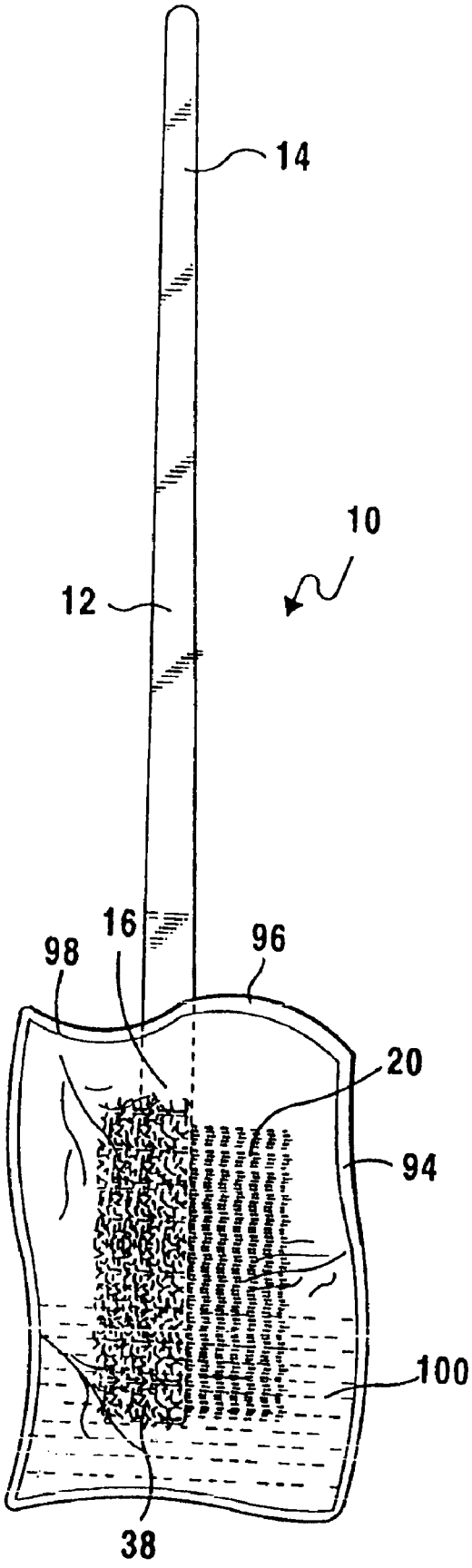

FIG. 10 in a perspective view of the all-sided mouthbrush of the present invention including a template having bristles formed of soluble crystals being connected thereto;

FIG. 11 is a front perspective view of a template for attachment to the all-sided mouthbrush of the present invention being removed from a protective packet; and FIG. 12 is a front perspective view of the all-sided mouthbrush of the present invention having an end portion thereto positioned within a protective packet, the protective packet including mouthwash therein for application to the bristles on the mouthbrush.

DESCRIPTION OF THE REFERENCED NUMERALS

Turning now descriptively to the drawings, in which similar reference characters denote similar elements throughout the several views, the Figures illustrate the all-sided mouthbrush of the present invention. With regard to the reference numerals used, the following numbering is used throughout the various drawing figures.

10 all-sided mouthbrush of the present invention
12 handle of mouthbrush
14 first end of handle
16 second end of handle
18 first side of second end
20 bristles extending from first side of second end
22 second side of second end
24 cleaning device on second end of second side
26 plurality of parallel ridges forming cleaning device
28 [device] *recesses* for selectively securing template to second side of second end
30 first alternate cleaning surface
32 plurality of columns of tuft-shaped bristles
34 second alternate cleaning surface
36 plurality of off set rows of spade headed bristles
38 third alternate cleaning surface
40 fourth alternate cleaning surface
42 plurality of rows of bristle-like structures
44 first template
46 plurality of parallel ridges forming first template
48 top side of first template
50 clips extending from first template
52 arrows indicating alignment of clips of first template with connection device
54 second template
56 columns of tuft-shaped bristles forming second template
58 clips extending from second template

60 arrows indicating alignment of clips of second template with connection device

61 third template

62 off set rows of spade-headed bristles forming third template

64 top side of third template

66 clips extending from third template

68 arrows indicating alignment of clips of third template with connection device

70 fourth template

72 scouring pad-like surface forming fourth template

74 clips extending from fourth template

76 arrows indicating alignment of clips of fourth template with connection device

78 fifth template

80 rows of bristle-like structures made of soluble crystals forming fifth template

82 top side of fifth template

84 clips extending from fifth template

86 arrows indicating alignment of clips of fifth template with connection device

88 packet for retaining cleaning surface

90 template

92 mouthwash

94 resealable packet

96 first end of resealable packet

98 locking mechanism on first end of resealable packet

100 mouthwash

DETAILED DESCRIPTION OF THE PREFERRED [EMBODIMENT] *EMBODIMENTS*

Turning now descriptively to the drawings, in which similar reference characters denote similar elements throughout the several views. FIGS. 1 through 12 illustrate *embodiments of* the all-sided mouthbrush of the present invention indicated generally by the numeral 10.

Figure 1:
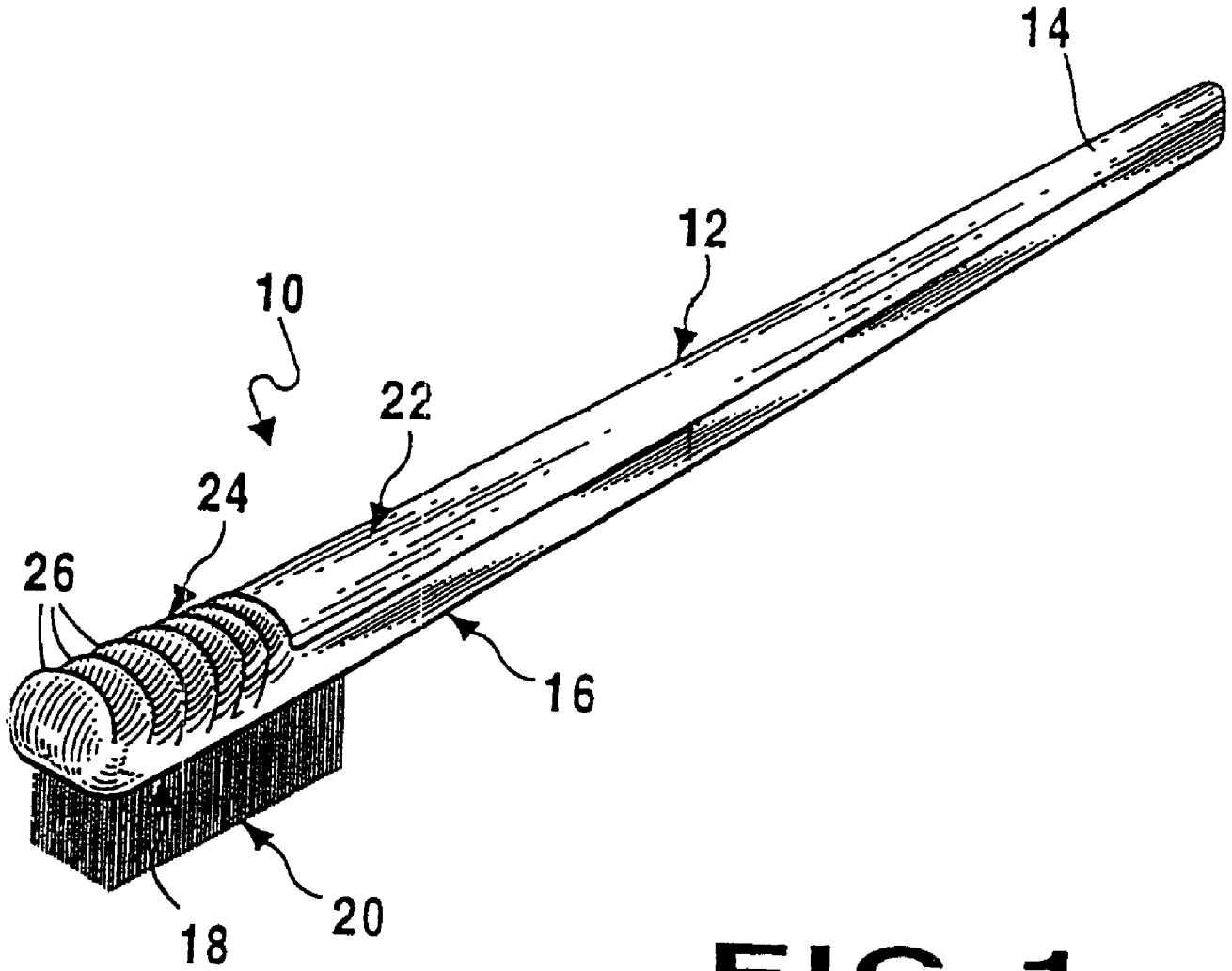
FIG. 1 is a perspective view of the all-sided mouthbrush of the present invention including a ridged surface on a side opposite the bristled surface.

The all-sided mouthbrush 10 is shown in FIG. 1 including a handle 12 having a first end 14 for grasping by a user and a second end 16 for insertion into the mouth of the user. Extending from a first side 18 of the second end 16 are bristles 20 for use in brushing the teeth of the user. The bristles 20 are similar to those found on conventional toothbrushes. On a second side 22 of the second end 16 opposite the bristles 20 is a cleaning device 24 for use in scraping, scrubbing brushing and massaging the tongue and inner surface of the mouth of the user. The cleaning device 24 extends around the surface of the second end 16 not covered by the bristles 20 to create an all around surface for cleaning the tongue *of the* user. The cleaning device 24 shown in FIG. 1 is a series of parallel ridges 26.

Figure 2:
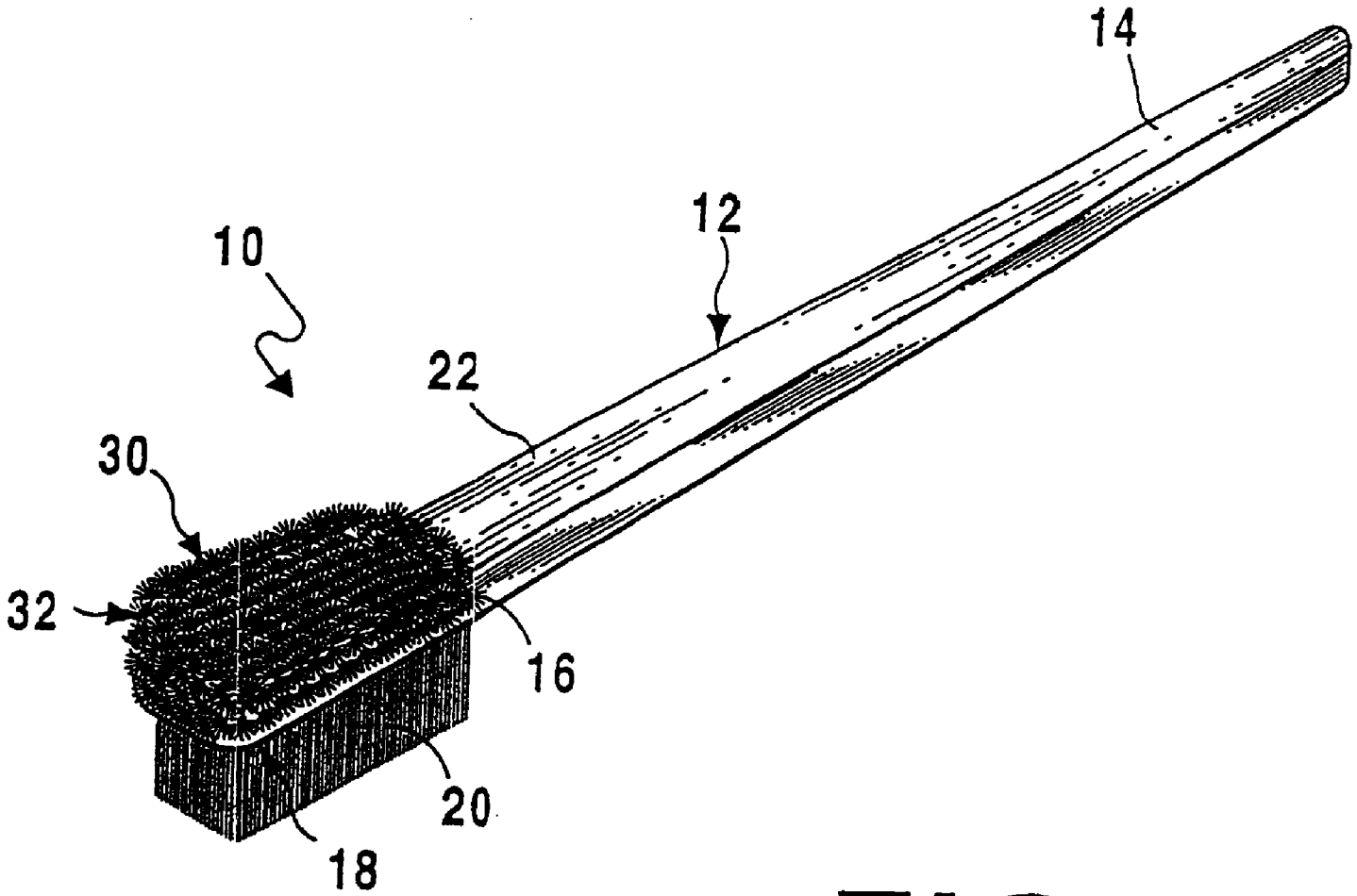
FIG. 2 is a perspective view of the all-sided mouthbrush of the present invention including tuft shaped bristles extending from a side opposite the bristled surface.
Figure 3:
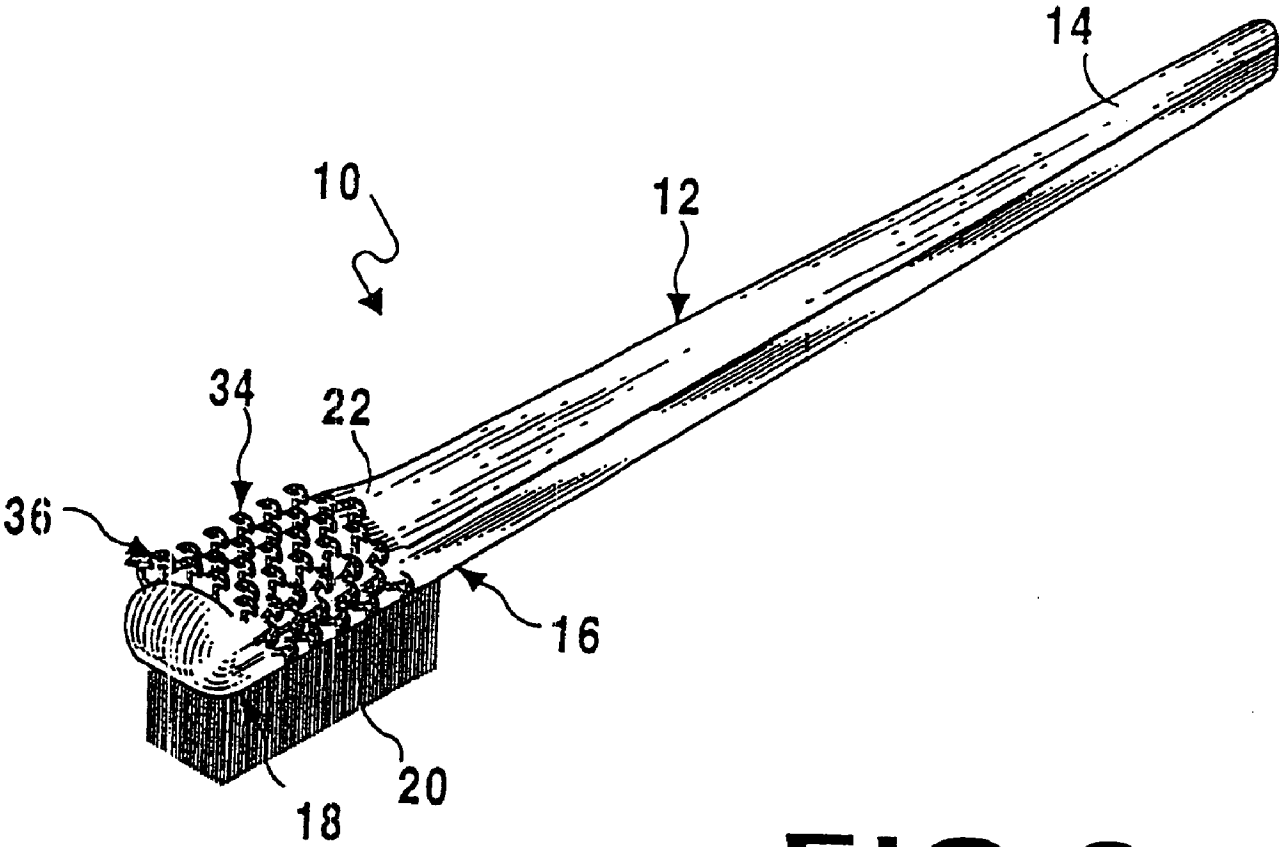
FIG. 3 is a perspective view of the all-sided mouthbrush of the present invention including alternating rows of spade-headed bristles extending from a side opposite the bristled surface.
Figure 4:
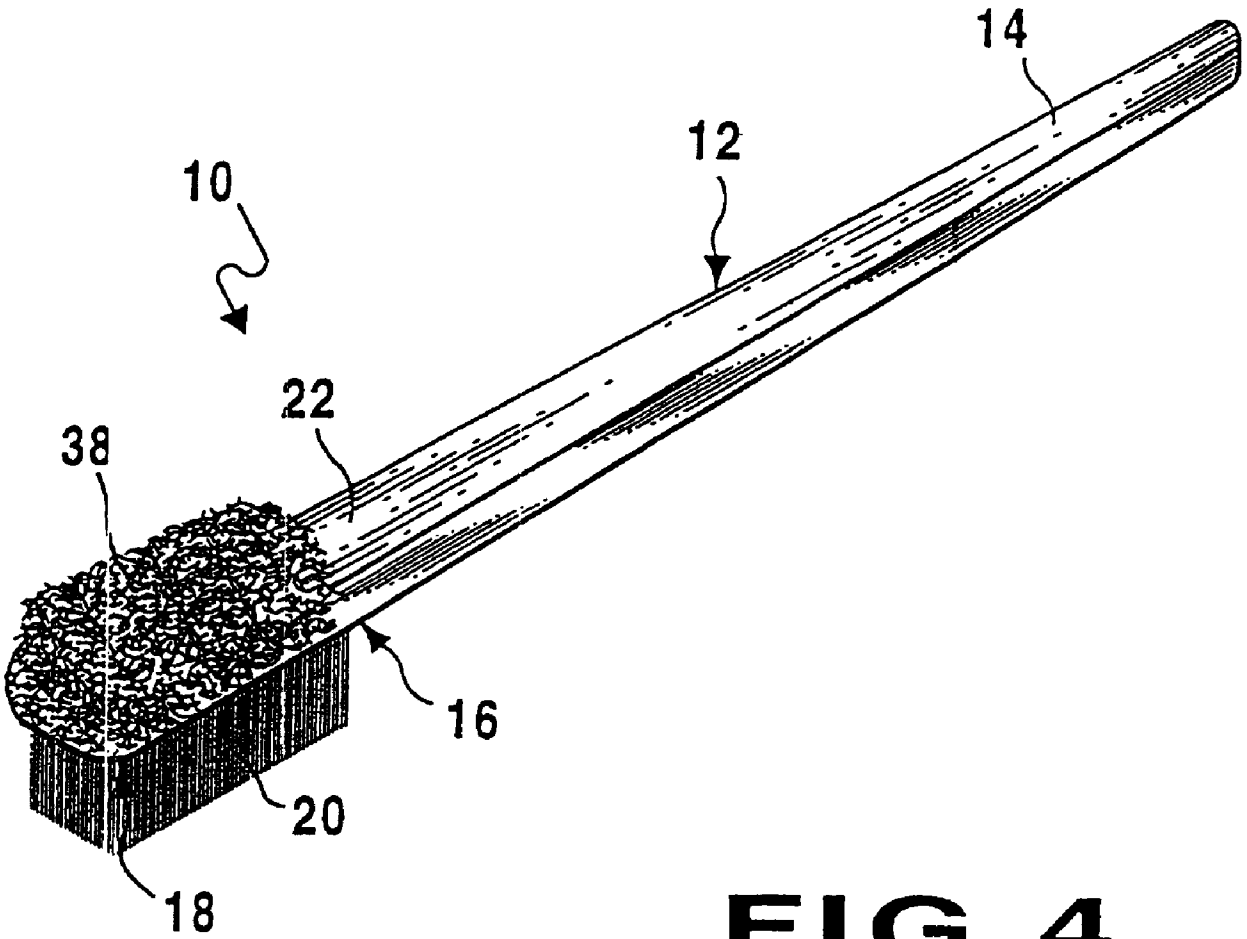
FIG. 4 is a perspective view of the all-sided mouthbrush of the present invention including a scouring pad-like surface on a side opposite the bristled surface.
Figure 5:
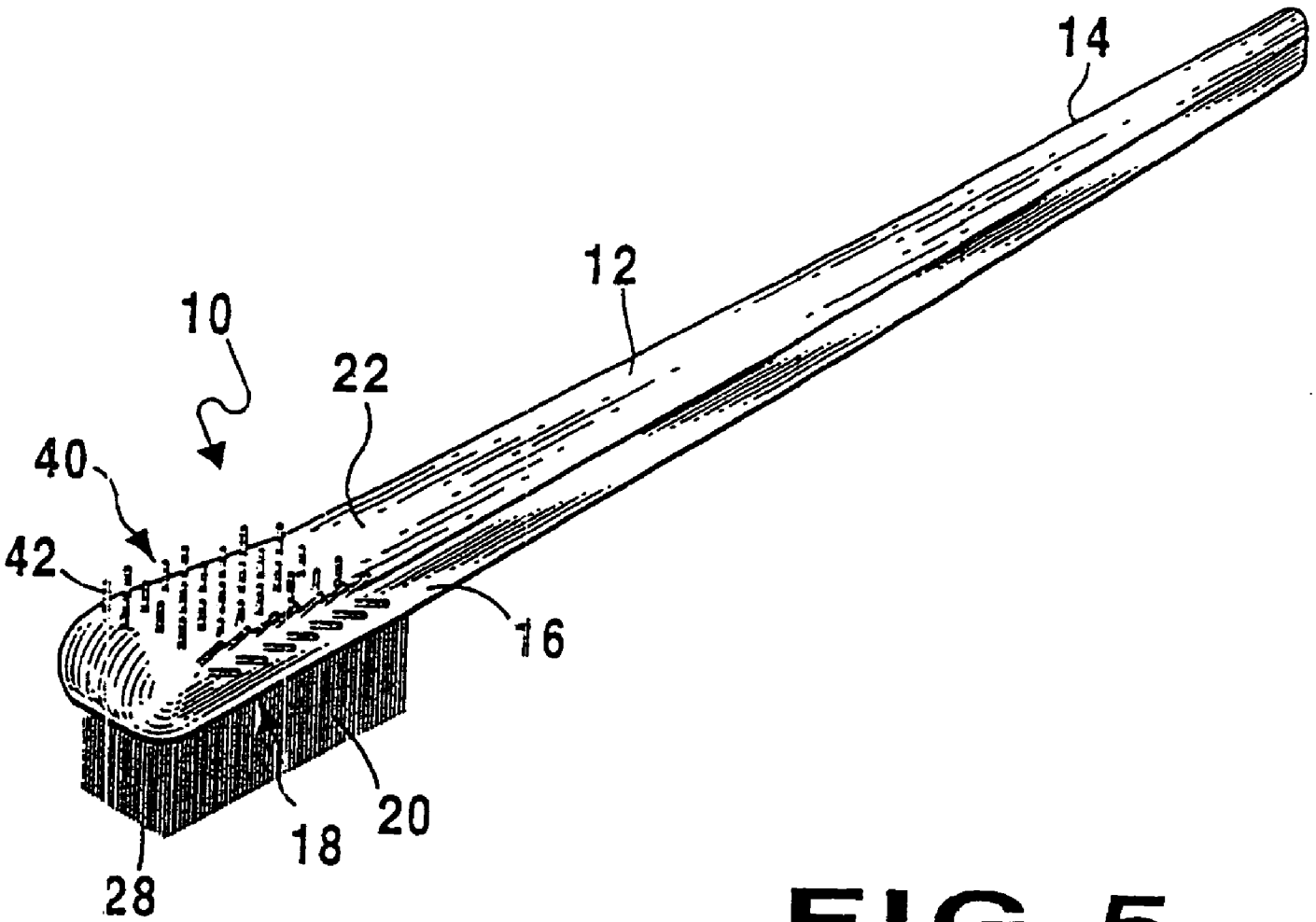
FIG. 5 is a perspective view of the all-sided mouthbrush of the present invention including bristles formed of soluble crystals extending from a side opposite the bristled surface.

Alternate cleaning devices may be positioned to extend from the second side 22 instead of the cleaning device 24 of FIG. 1. Examples of such alternate cleaning devices are illustrated in FIGS. 2–5. A first alternate cleaning device 30 is illustrated in FIG. 2 and is formed by a bristle surface having a plurality of columns of tuft-shaped bristles 32 connected to the second side 22 of the handle 12. The plurality of columns of tuft-shaped bristles 32 face opposite the conventional toothbrush bristles 20 and are useful in scrubbing the tongue and inner side of the mouth of the user. The plurality of tuft-shaped bristles 32 extend all around the surface of the second end 16 not covered by the bristles 20 in a manner similar to the cleaning device 24 to create an all around surface for cleaning the tongue and inner surface of the mouth of a user. FIG. 3 illustrates a second alternate cleaning device 34 having a bristle surface formed of a plurality of off set rows of spade headed bristles 36. The spade beaded bristles 36 act to scrape the tongue and other skin surfaces within the mouth of the user. The spade headed bristles 36 extend from all around the surfaces of the second end 16 not covered by the bristles 20 in a manner similar to the cleaning device 24 and tuft-shaped bristles 32 to create an all around surface for cleaning the tongue and inner surface of the mouth of a user. A third alternate cleaning surface is illustrated in FIG. 4 and is formed of a scouring pad-like surface 38 connected to the second side 22 of the handle 12. The scouring pad-like surface 38 faces in a direction opposite the conventional toothbrush bristles 20 and is useful in scrubbing the tongue and inner side of the mouth of the user. The scouring pad-like surface 38 extends from all around the surfaces of the second end 16 not covered by the bristles 20 in a manner similar to the cleaning device 24, tuft-shaped bristles 32 and spade headed bristles 36 of FIGS. 1–3 to create an all around surface for cleaning the tongue and inner surface of the mouth of a user. FIG. 5 illustrates a fourth alternate cleaning surface 40 formed of a bristle surface having of a plurality of rows of bristle-like structures 42 formed of soluble crystals. The plurality of rows of bristle-like structures 42 act to freshen and refresh the tongue and other skin surfaces within the mouth of the user. The plurality of rows of bristle-like structures 42 extend from all around the surfaces of the second end 16 not covered by the bristles 20 in a manner similar to the cleaning device 24, tuft-shaped bristles 32 and scouring pad-like surface 38 of FIGS. 1–4 to create an all around surface for cleaning the tongue and inner surface of the mouth of a user.

Figure 6:
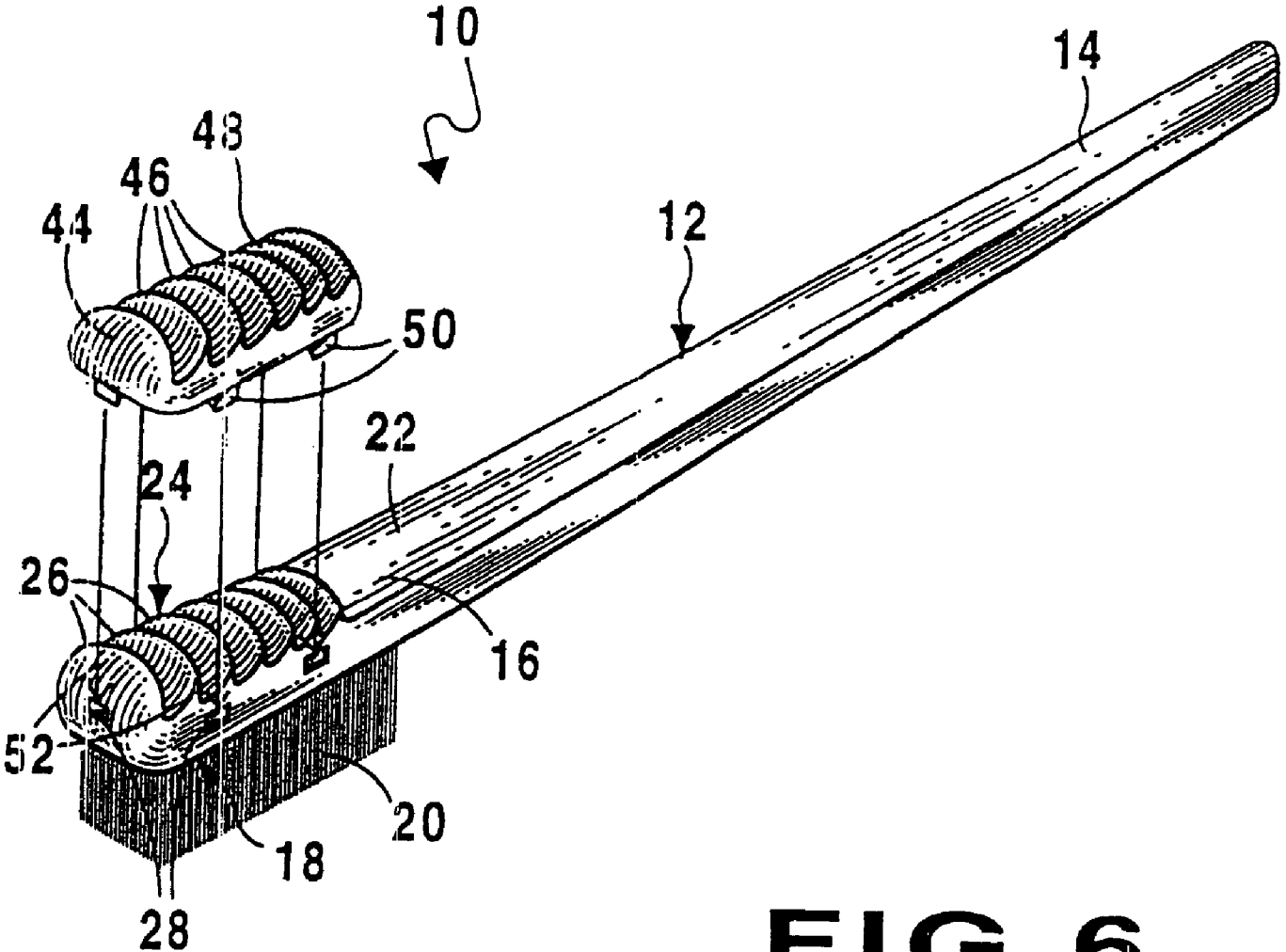
FIG. 6 is a perspective view of the all-sided mouthbrush of the present invention including a template having a ridged surface being connected thereto.

The all-sided mouthbrush 10 including the cleaning [surface] *device* 24 is illustrated in FIG. 6 including a first template 44 for attachment over the cleaning [surface] *device* 24. The first template 44 includes a plurality of parallel ridges 46 extending along a top side 48 thereof. The bottom side of the first template 44 forms a [pool] *cavity* (*not shown*) for receiving the cleaning device 24 therein. A connection device [28] is positioned on the second end of the handle 12 between the bristles 12 and the cleaning device on the second side 22. The connection device [28] is preferably formed of a plurality of recesses *28* extending into the second end 16 of the handle 12 for receiving the clips 50 of the first template 44. A plurality of clips 50 extend from the side of the first template 44 for releasably connecting with the [connection device] *recesses* 28. The arrows labeled with the number 52 illustrate the direction in which a force is applied to the first template 44 and the alignment of the recesses *28* forming the connection [device 24] with the clips 50.

Figure 7:
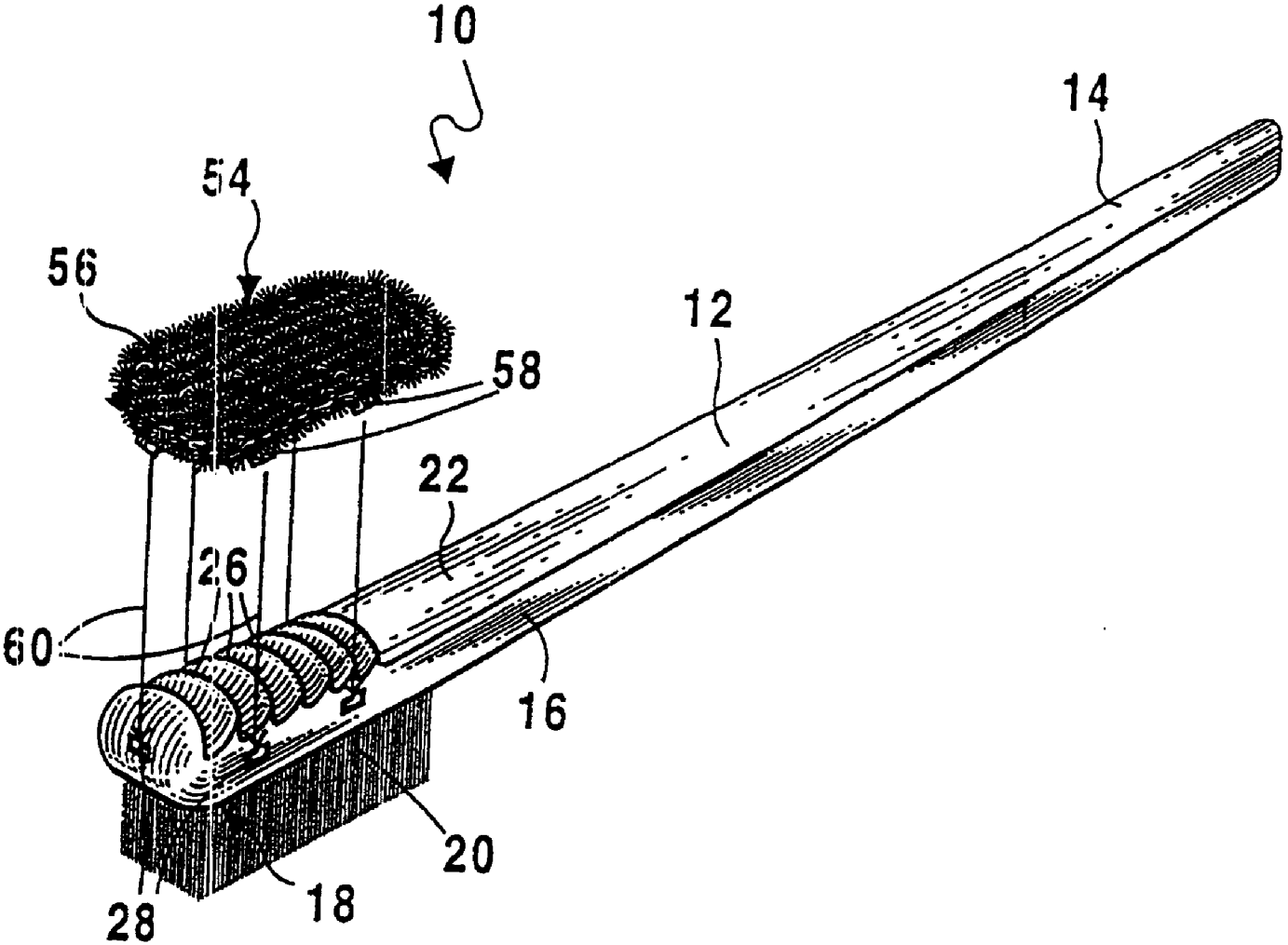
FIG. 7 is a perspective view of the all-sided mouthbrush of the present invention including a template having tuft-shaped bristles being connected thereto.

The all-sided mouthbrush 10 including the cleaning surface 24 is illustrated in FIG. 7 including a second template 54 for attachment over the cleaning [surface] *device* 24. The second template 54 includes a plurality of columns of tuft-shaped bristles 56 extending along a top slide thereof. The bottom side of the second template 54 forms a [pool] *cavity* (*not shown*) for receiving the *ribs 26 of the* cleaning device 24 therein. A plurality of clips [56] *58* extend from the side of the second template 44 for releasably connecting with the *recesses 28 in the* connection device [28]. The connection device [28] is preferably formed of a plurality of recesses *28* extending into the second end 16 of the handle 12 for receiving the clips [56] *58* of the second template 54. The arrows labeled with the number [58] *60* illustrate the direction in which a force is applied to the second template 54 and the alignment of the recesses *28* forming the connection device [28] with the clips [56] *58*.

Figure 8:
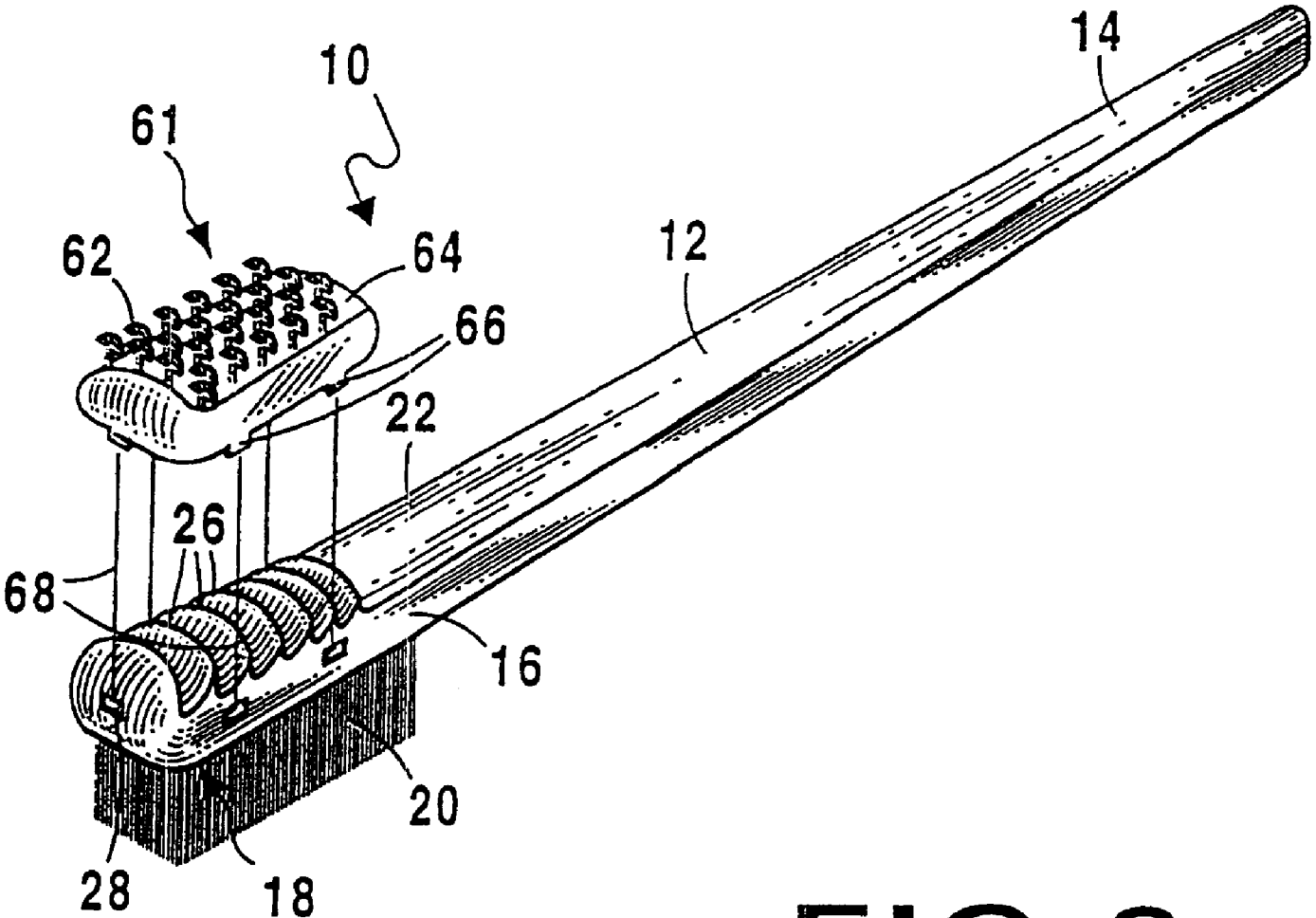
FIG. 8 is a perspective view of the all-sided mouthbrush of the present invention including a template having alternating rows of spade beaded bristles being connected thereto.

The all-sided mouthbrush 10 having the cleaning [surface] *device* 24 is illustrated in FIG. 8 including; a third template [60] *61* for attachment the cleaning [surface] *device* 24. The third [60] *61* includes a plurality of rows of off set spade-headed bristles 62 extending along a top side 64 thereof. The bottom side of the third template [60] *61* forms a [pool] *cavity* (*not shown*) for receiving the cleaning device 24 therein. A plurality of clips 66 extend from the side of the third template [60] *61* for releasably connecting with the *recesses in the* connection device [28]. The connection device [28] is preferably formed of a plurality of recesses *28* extending into the second end 16 of the handle 12 for receiving the clips 66 of the third template [60] *61*. The arrows labeled with the number 68 illustrate the direction in which a force is applied to the third template [60] *61* and the alignment of the recesses *28* forming the connection device [28] with the clips 66.

Figure 9:
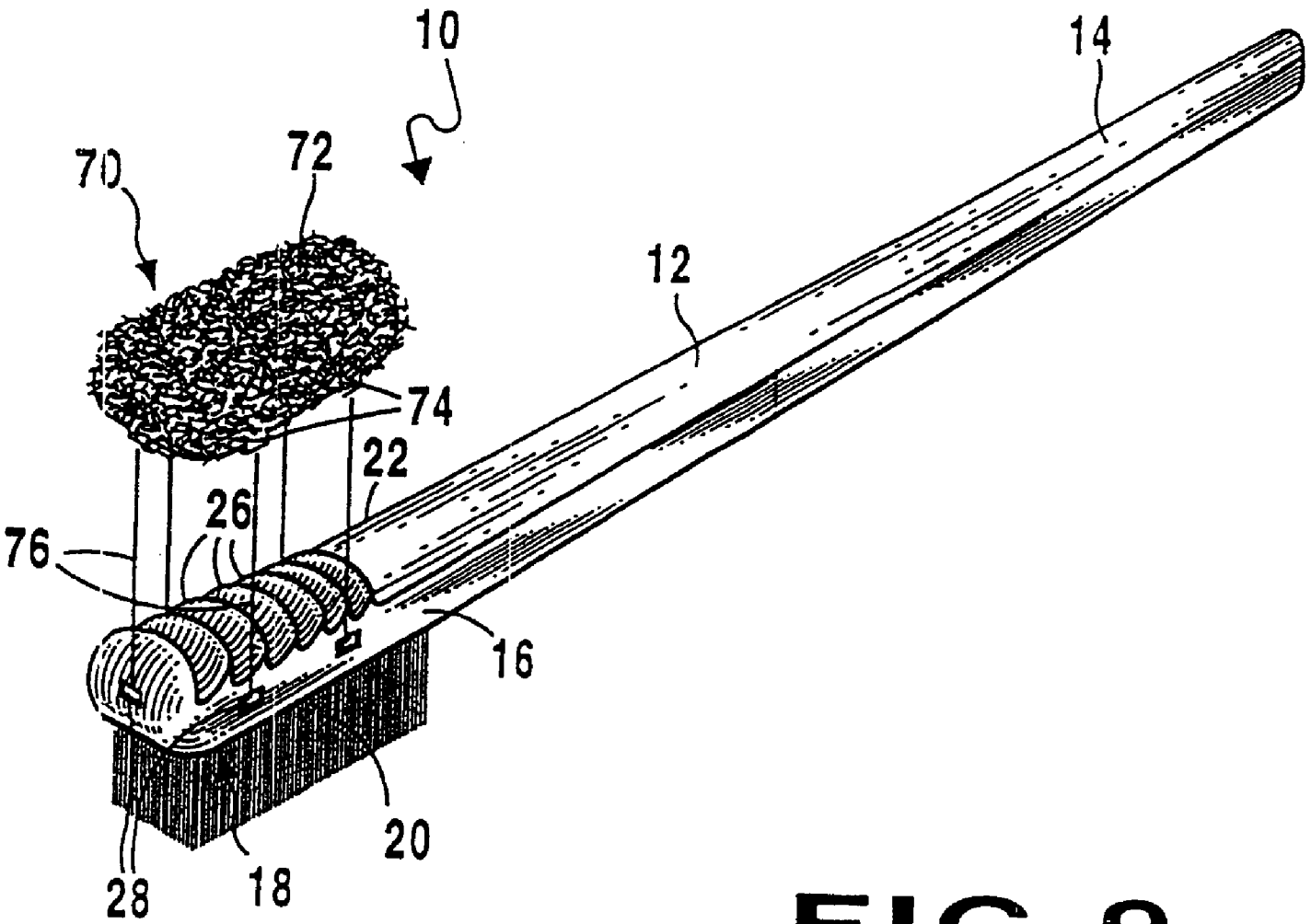
FIG. 9 Is a perspective view of the all-sided mouthbrush of the present invention including a template having a scouring pad-like surface being connected thereto.

The all-sided mouthbrush 10 including the cleaning surface 24 is illustrated in FIG. 9 including a fourth template 70 for attachment over the cleaning [surface] *device* 24. The fourth template 70 includes a scouring pad-like surface 72 extending along a top side thereof. The bottom side of the fourth template 70 forms a [pool] *cavity* (*not shown*) for receiving the cleaning device 24 therein. A plurality of clips 74 extend from the side of the fourth template 70 for releasably connecting with the *recesses 28 of the* connection device [28]. The connection device [28] is preferably formed of a plurality of recesses *28* extending into the second end 16 of the handle 12 for receiving the clips 74 of the fourth template 70. The arrows labeled with the number 76 illustrate the direction in which a force is applied to the fourth template 70 and the alignment of the recesses *28* forming the connection device [28] with the clips 74.

The all-sided mouthbrush 10 including the leaning surface 24 is illustrated in FIG. 10 including a fifth template 78 for attachment over the cleaning [surface] *device* 24. The fifth template 78 includes a plurality of rows of bristle-like structures *80* made of soluble crystals 80 extending along a top side 82 thereof. The bottom side of the fifth template 78 forms a [pool] *cavity* (*not shown*) for receiving the cleaning device 24 therein. A plurality of clips 84 extend from the side of the fifth template 78 for releasably connecting with the *recesses 28 of the* connection device [28]. The connection device [28] is preferably formed of a plurality of recesses *28* extending into the second end 16 of the handle 12 for receiving the clips 84 of the fifth template 78. The arrows labeled with the number 86 illustrate the direction in which a force is applied to the fifth template 78 and the alignment of the recesses forming the connection device 28 with the clips 56.

FIG. 11 illustrates a sealed packet 88 in which a template 90 is positioned. The template 90 is similar to the templates illustrated in FIGS. 6–10 and is for connection with the all-sided mouthbrush of the present invention. The sealed pocket 88 may include mouthwash 92 or some other similar mouth cleansing liquid which may be used to rinse the mouth of the user after using the all-sided mouthbrush.

FIG. 12 illustrates a resealable packet 94 in which the all-sided mouthbrush 10 may be placed when not in use. The resealable packet 94 includes a first end 96 including a resealable locking mechanism 98 through which the second end 16 of the handle 12 will be inserted into the packet 94. The packet 94 wil protect the second end 16, the bristles 20 and the alternate cleaning surface 38 when the all-sided mouthbrush 10 is not being used. Mouthwash 100 or some other similar mouth cleansing liquid which may be used to rinse the mouth of the riser after using the all-sided mouthbrush may be poured into the packet 94 with the second end 16 of the handle 12.

While a preferred structure for the connecting the template to the handle is shown and described herein, those of ordinary skill in the art who have read this description will appreciate that there are numerous other structures for connecting the template to the handle and, therefore, as used herein the phrase "means for connecting the template to the handle" should be construed as including all such structures as long as they achieve the desired result of connecting the template to the handle, and therefore, that all such alternative mechanisms are to be considered as equivalent to the one described herein.

The operation of the all-sided mouthbrush 10 will now be described with reference to the figures. In operation, the all-sided mouthbrush 10 is contained within a resealable packet 94 from which it must be removed. The packet 94 may contain mouthwash 100 for covering the bristles and aiding in freshening the mouth of the user during and after use. The templates are also each contained in resealable packets 88 from which they must be removed. The packets 88 may contain a mouthwash 100 for covering the cleaning surface thereof and aiding in freshening the mouth of the user during and after use. The user will decide which cleaning surface is desired to be used and remove the appropriate template from its packet 88.

The user will now releasably secure the template to the second sidle 22 of the handle 12 opposite the conventional bristles 20. This is performed by applying a force on the template towards the second side 22 until the clips extending from the template engage the connection device 28 on the handle 12. The all-sided mouthbrush 10 is now ready for use.

The user will brush the teeth in the usual manner using the conventional toothbrush bristles. Once completed, the user will then use the alternate cleaning surface provided by the template and using a back and forth or side to side motion will scrub the alternate cleaning surface against the tongue and inner aide of the mouth. This scrubbing will act to clean the tongue and inner side of the mouth of the user. The user may then rinse the mouth with any mouthwash in the packets 88 and 94.

Once finished the user will remove the template by applying a force in a direction opposite the connection force to disengage the clips from the connection device. The template will then be placed within its packet 88 and the packet 88 will be resealed. The second end 16 of the all-sided mouthbrush 10 will then be inserted into its packet 94 and the packet 94 will be resealed. The all-sided mouthbrush 10 and the template will then be put away for use in the future.

From the above description it can be seen that the all-sided mouthbrush of the present invention is able to overcome the shortcomings of prior art devices by providing an all-sided mouthbrush which is able to clean the tongue and inner mouth surfaces in addition to cleaning the teeth of the user. The all-sided mouthbrush includes a handle having conventional toothbrush bristles extending from a side of one end thereof and a connection device for selectively receiving one of the plurality of templates on a side opposite the conventional toothbrush bristles, the plurality of templates including a template having a ridged surface for scraping the tongue and inner surfaces of the mouth, a template having bristles forming tufts for scraping the tongue and inner surfaces of the mouth, a template having spade shaped bristles for scraping the tongue and inner surfaces off the mouth and a template having a scouring-like pad for scrubbing the tongue and inner surfaces of the mouth. The all-sided mouthbrush may also include bristles which include an upper surface formed of a soluble crystal substance able to freshen the mouth of the user while brushing the teeth. The all-sided mouthbrush is able to be used as a platform for attaching various pads thereto which can scrape, clean and massage the tongue, gums and interior surfaces of the mouth with ointments, mouthwash and antiseptics such as hydrogen peroxide. The all-sided mouthbrush may also include a plurality of non-abrasive pads for massaging the tongue, gums and interior surfaces of the mouth of the user. Furthermore, the all-sided mouthbrush of the present invention is simple and easy to use and economical in cost to manufacture.

It will tic undo stood that each of the elements described above, or two or more together may also find a useful application in other types of methods differing front the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An all-sided mouthbrush for cleaning a mouth of a user, said all-sided mouthbrush comprising:

a) a handle including a first end having oppositely facing first and second sides;

b) bristles extending from said first side;

c) an alternate cleaning device connected to said second side, said bristles being adapted to clean teeth of the user and said alternate cleaning device being adapted to scrub and clean the tongue and inner side of the mouth of the user; and d) said alternate cleaning device includes a plurality of parallel ridges extending from all sides of said first end not occupied by said bristles for scraping the tongue and inner side of the mouth of the user.

2. The all-sided mouthbrush as recited in claim 1, further comprising a resealable packet for receiving said first end of said handle when not in use.

3. The all-sided mouthbrush as recited in claim 2, further comprising a freshening liquid positioned within said resealable packet for freshening said bristles and alternate cleaning device when positioned within said resealable packet.

4. An all-sided mouthbrush for cleaning a mouth of a user, said all-sided mouthbrush comprising:

a) a handle including a first end having first and second sides;

b) bristles extending from said first side; and c) an alternate cleaning device connected to said second side, wherein said bristles clean teeth of the user and said alternate cleaning device is scrubbed against a tongue and inner side of the mouth thereby cleaning the tongue and inner side of the mouth of the user; and d) said alternate cleansing device includes a plurality of spade headed bristles extending; from all sides of said first end not occupied by said bristles for scraping the tongue and inner side of the mouth of the user.

5. An all-sided mouthbrush for cleaning a mouth of a user, said all-sided mouthbrush comprising:

a) a handle including a first end having first and second sides;

b) bristles extending from said first side;

c) an alternate cleaning device connected to said second side, wherein sold bristles clean teeth of the user and said alternate cleaning device is scrubbed against a tongue and inner side of the mouth thereby cleaning the tongue and inner side of the mouth of the user; and d) said alternate cleaning device includes a plurality of off set rows of bristle-like structures extending from all sides of said first end not occupied by said bristles for scraping the tongue and inner side of the mouth of the user, said bristle-like structures being made of soluble crystals.

6. An all-sided mouthbrush for cleaning a mouth of a user, said all-sided mouthbrush comprising:

a) a handle including a first end having first and second sides;

b) bristles extending from said first side;

c) an alternate cleaning device connected to said second side, wherein said bristles clean teeth of the user and said alternate cleaning device is scrubbed against a tongue and inner side of the mouth thereby cleaning the tongue and inner side of the mouth of the user; and d) a plurality of templates each including a respective alternate cleaning surface and means for connecting one of said plurality of templates to said second side covering said alternate cleaning device.

7. The all-sided mouthbrush as recited in claim 6, wherein said cleaning surface on each of said plurality of templates is one of a plurality of parallel ridges, a plurality of columns of tuft-shaped bristles, a plurality of spade headed bristles, a scouring pad-like surface and a plurality of off set rows of bristle-like structures made of soluble crystals.

8. The all-sided mouthbrush as recited in claim 7, wherein each of said plurality of templates includes at least one clip extending therefrom and said connecting device includes at least one recess extending into said first end of said handle for receiving said at least one clip of a respective one of said plurality of templates.

9. The all-sided mouthbrush as recited in claim 6, further comprising a resealable packet for receiving said first end of said handle when not in use.

10. The all-sided mouthbrush as recited in claim 9, further comprising a plurality of pouches, each pouch receiving a respective one of said plurality of templates when not secured to said second side.

11. The all-side mouthbrush as recited in claim 10, further comprising a freshening liquid positioned within each of said plurality of pouches for freshening said bristles and alternate cleaning device when positioned within said resealable packet.

12. The all-sided mouthbrush as recited in claim 9, further comprising a freshening liquid positioned within said resealable packet for freshening said bristles and alternate cleaning device when positioned within said resealable packet.

13. The all-sided mouthbrush as recited in claim 6, further comprising a plurality of pouches, each pouch receiving a respective one of said plurality of templates when not secured to said second side.

14. The all-sided mouthbrush as recited in claim 13, further comprising a freshening liquid positioned within each of said plurality of pouches for freshening said bristles and alternate cleaning device when positioned within said resealable packet.

*15. A toothbrush for cleaning a mouth of a user, said toothbrush comprising:*

*a) a handle including a first end, said first end having first and second sides;*

*b) bristles extending from said first side, wherein said bristles are adapted to clean the teeth of the user; and*

*c) an alternate cleaning device on said second side, said alternate cleaning device being disposed to clean and massage the tongue, gums and inner surfaces of the mouth of the user, said alternative cleaning device comprising at least one ridge, said at least one ridge extending into the portions of said handle between said first and second sides.*

*16. A toothbrush as claimed in claim 15, wherein said at least one ridge is a plurality of parallel ridges.*

*17. A toothbrush for cleaning a mouth of a user, said toothbrush comprising:*

*a) a handle including a first end, said handle having first and second sides;*

*b) bristles extending from said first side; and*

*c) an alternate cleaning device on said second side, wherein said bristles are disposed to clean teeth of the user and said alternate cleaning device being disposed to clean and massage the tongue, gums and inner surfaces of the mouth of the user, said alternative cleaning device comprising a scouring pad-like surface extending onto the portions of said handle between said first and second sides.*

*18. A toothbrush for cleaning the mouth of a user, said toothbrush comprising:*

*a) a handle including a first end, said first end having first and second sides;*

*b) bristles extending from said first side, said bristles being adapted to clean the teeth of the user;*

*c) an alternate cleaning device connected to a desired portion of said second side and extending into the portions of said handle between said first and second sides, said alternate cleaning device for scraping, cleaning and massaging the tongue, gums and inner surfaces of the mouth of the user; and*

*d) said alternate cleaning device including at least one of at least one ridge, at least one spaded headed bristle, and a scouring pad surface.*

*19. The toothbrush as claimed in claim 18, wherein said at least one spaded headed bristle includes a plurality of rows of spade headed bristles, said plurality of rows being offset from each other.*

*20. The toothbrush as claimed in claim 18, wherein said at least one ridge is a plurality of parallel ridges.*

*21. The toothbrush as claimed in claim 18, wherein said alternate cleaning device is a template and said handle includes a connection device for releasably connecting said template thereto.*

* * * * *

UNITED STATES PATENT AND TRADEMARK OFFICE

CERTIFICATE OF CORRECTION

PATENT NO. : RE 39,185 E
APPLICATION NO. : 10/246253
DATED : July 18, 2006
INVENTOR(S) : Dennis W. Noe and Chris M. Sold It is certified that error appears in the above-identified patent and that said Letters Patent is hereby corrected as shown below:

On the title page, item (57), line 25, “user].” should read --user.]--.

Column 10, line 4, “cleansing” should read --cleaning--.

Column 10, line 5, “extending; from” should read --extending from--.

Column 10, line 14, “sold” should read --said--.

Column 11, line 17, “alternative” should read --alternate--.

Column 12, line 1, “alternative” should read --alternate--.

Column 12, line 19, “spaded” should read --spade--.

Column 12, line 22, “spaded” should read --spade--.

Signed and Sealed this

Sixth Day of March, 2007

JON W. DUDAS
*Director of the United States Patent and Trademark Office*